United States Patent

Schreder et al.

(10) Patent No.: US 10,703,669 B2
(45) Date of Patent: Jul. 7, 2020

(54) FILTER GAS

(71) Applicant: SCHOTT AG, Mainz (DE)

(72) Inventors: Bianca Schreder, Sulzbach (DE); Ute Woelfel, Mainz-Laubenheim (DE); Stefanie Hansen, Gensingen (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/964,083

(22) Filed: Apr. 27, 2018

(65) Prior Publication Data

US 2018/0312424 A1 Nov. 1, 2018

(30) Foreign Application Priority Data

Apr. 28, 2017 (DE) .................. 10 2017 207 253

(51) Int. Cl.
C03C 3/17 (2006.01)
C03C 4/08 (2006.01)
G02B 5/22 (2006.01)
C03C 3/062 (2006.01)
C03C 4/02 (2006.01)
C03C 3/21 (2006.01)

(52) U.S. Cl.
CPC .............. C03C 3/062 (2013.01); C03C 3/21 (2013.01); C03C 4/02 (2013.01); G02B 5/226 (2013.01); C03C 4/082 (2013.01)

(58) Field of Classification Search
CPC ............ C03C 3/17; C03C 3/062; G02B 5/226
See application file for complete search history.

(56) References Cited

U.S. PATENT DOCUMENTS

| | | | |
|---|---|---|---|
| 2,532,386 A | 12/1950 | Armistead | |
| 4,105,577 A | 8/1978 | Yamashita | |
| 4,110,245 A | 8/1978 | Yamashita | |
| 4,217,382 A | 8/1980 | Toratani | |
| 4,350,675 A | 9/1982 | Drake | |
| 5,173,212 A | 12/1992 | Speit et al. | |
| 5,234,871 A * | 8/1993 | Krashkevich | C03C 3/062 501/46 |
| 5,249,076 A | 9/1993 | Fujiwara et al. | |
| 5,290,544 A | 3/1994 | Shimono et al. | |
| 5,714,244 A | 2/1998 | Delaval et al. | |
| 6,171,647 B1 | 1/2001 | Holman | |
| 6,432,851 B1 | 8/2002 | Aitken | |
| 7,816,292 B2 | 10/2010 | Zimmer et al. | |
| 7,905,115 B2 | 3/2011 | Rake et al. | |
| 8,080,490 B2 | 12/2011 | Fechner et al. | |
| 9,057,836 B2 | 6/2015 | Schreder et al. | |
| 9,105,908 B2 | 8/2015 | Peuchert et al. | |
| 9,388,069 B2 | 7/2016 | Schreder et al. | |

(Continued)

FOREIGN PATENT DOCUMENTS

| | | |
|---|---|---|
| CN | 101108768 A | 1/2008 |
| CN | 103058519 A | 4/2013 |

(Continued)

*Primary Examiner* — Karl E Group

(57) ABSTRACT

The invention relates to a filter glass comprising $Na_2O$ and $K_2O$ and the following (in % by weight on an oxide basis):

| | |
|---|---|
| $P_2O_5$ | 58-68 |
| $Al_2O_3$ | 5-10 |
| CuO | 8-15 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17. |

25 Claims, 1 Drawing Sheet

(56) References Cited

U.S. PATENT DOCUMENTS

| | | | |
|---|---|---|---|
| 2002/0023465 A1 | 2/2002 | Ogino | |
| 2003/0181307 A1 | 9/2003 | Myers et al. | |
| 2004/0082460 A1 | 4/2004 | Yamane et al. | |
| 2006/0166806 A1 | 7/2006 | Fechner et al. | |
| 2006/0268401 A1* | 11/2006 | Fischer, Jr. | G01N 17/002 359/361 |
| 2007/0099787 A1 | 5/2007 | Hayden et al. | |
| 2012/0165178 A1 | 6/2012 | Ritter et al. | |
| 2013/0105744 A1* | 5/2013 | Ogawa | C03B 32/00 252/587 |
| 2013/0264672 A1* | 10/2013 | Schreder | C03C 3/00 257/432 |
| 2013/0344343 A1 | 12/2013 | Schreder et al. | |
| 2015/0321942 A1 | 11/2015 | Masuda et al. | |

FOREIGN PATENT DOCUMENTS

| | | | |
|---|---|---|---|
| CN | 104788019 A | 7/2015 | |
| DE | 158896 | 2/1983 | |
| DE | 4031469 C1 | 2/1992 | |
| DE | 4228736 A1 | 3/1993 | |
| DE | 10214273 A1 | 10/2003 | |
| DE | 10308186 A1 | 9/2004 | |
| DE | 10308227 A1 | 9/2004 | |
| DE | 102004026433 A1 | 12/2005 | |
| DE | 102005001078 A1 | 7/2006 | |
| DE | 102010013293 A1 | 9/2011 | |
| DE | 102011056873 A1 | 6/2012 | |
| DE | 102012103077 A1 | 10/2013 | |
| DE | 102012210552 A1 | 12/2013 | |
| EP | 0187574 B1 | 10/1989 | |
| EP | 481165 A1 | 4/1992 | |
| EP | 0596310 A1 | 5/1994 | |
| EP | 0686175 B1 | 12/1997 | |
| FR | 2682373 A1 | 4/1993 | |
| GB | 2178422 A | 2/1987 | |
| JP | 63025245 A * | 2/1988 | C03C 4/082 |
| JP | 63025245 A | 2/1988 | |
| JP | 63035434 A | 2/1988 | |
| JP | 1167257 A | 6/1989 | |
| JP | 02217334 A * | 8/1990 | C03C 3/17 |
| JP | 1994036697 B2 | 5/1994 | |
| JP | 6234546 A | 8/1994 | |
| JP | 06234546 A * | 8/1994 | |
| JP | 10101370 A2 | 4/1998 | |
| JP | 2001199740 A | 7/2001 | |
| JP | 2004087421 A | 4/2004 | |
| JP | 2005097067 A | 4/2005 | |
| JP | 2006151793 A | 6/2006 | |
| JP | 2009263190 A | 11/2009 | |
| JP | 2010059013 A | 3/2010 | |
| JP | 2011162409 A | 8/2011 | |
| JP | 2015143833 A | 8/2015 | |
| WO | 9311077 A1 | 6/1993 | |
| WO | 9526934 A1 | 10/1995 | |
| WO | 2011046155 A1 | 4/2011 | |
| WO | 2012036899 A2 | 3/2012 | |
| WO | 2014119780 A1 | 8/2014 | |

* cited by examiner

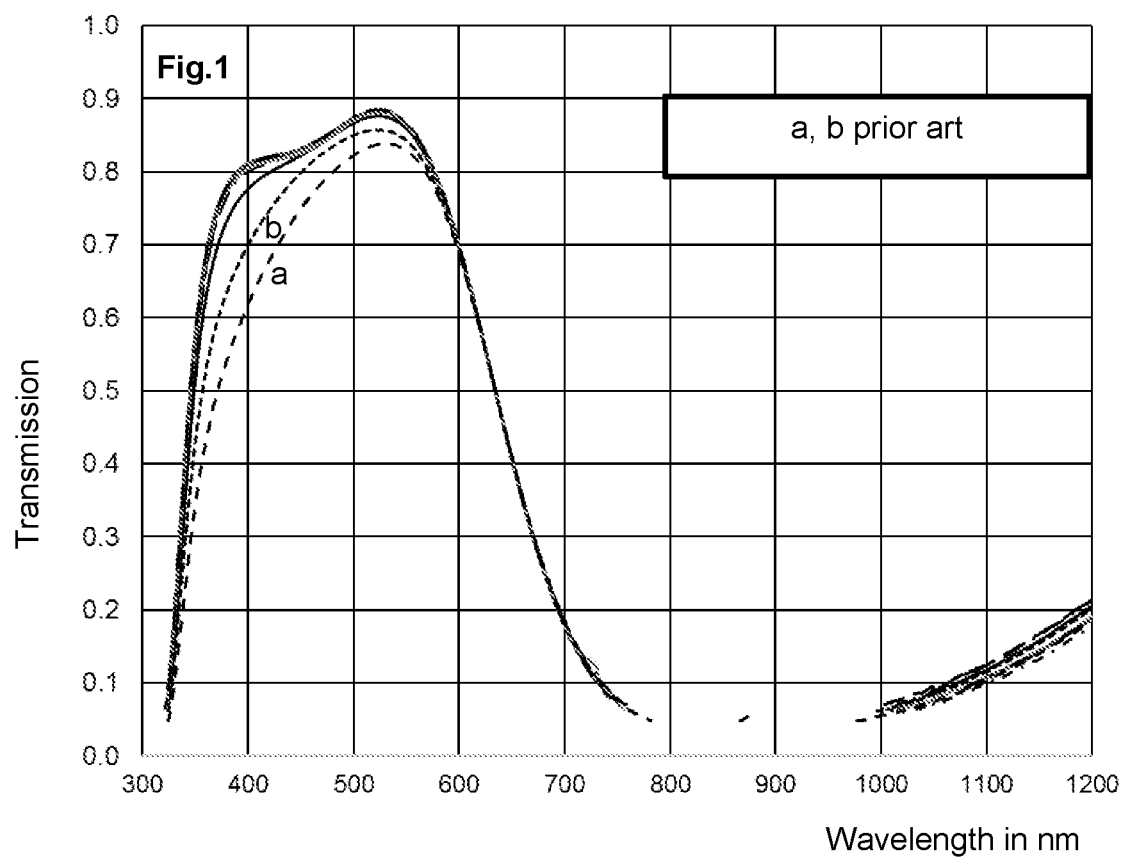
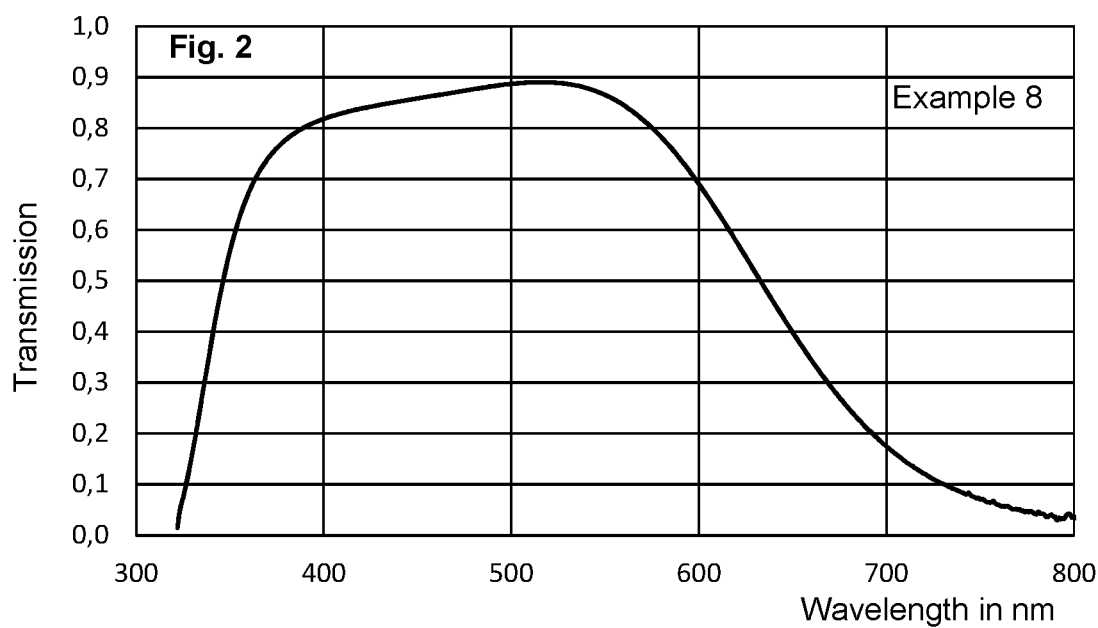

FILTER GAS

This application claims priority of German patent application DE 10 2017 207 253.9, the entire contents of which are hereby incorporated by reference.

TECHNICAL FIELD OF THE INVENTION

The present invention relates to filter glasses, in particular phosphate glasses, which are coloured blue for use as filter, and also the production thereof.

BACKGROUND OF THE INVENTION

Field of the Invention

The filter glasses of the abovementioned type can be used as optical bandpass filters, i.e. as filters having a more or less narrow wavelength range of high transmission (passband, in German "Durchlassbereich") which is surrounded by two blocking ranges (in German "Sperrbereiche") having very low transmission. Such glasses are used as optical glass filters, for example as colour correction filters in colour video cameras and digital cameras. Further fields of application are filters for blocking the near IR (NIR) radiation of LEDs, e.g. in displays etc. Apart from the high transparency in the wavelength range from about 400 to about 650 nm, a steep edge, i.e. a rapid decrease in transmission, to the adjoining UV range below <400 nm and a very low transmission at wavelengths above 700 nm is desirable. NIR-blocking filters are also used in the fields of aviation/navigation, for which reason a certain reliability of colour locus with strong blocking is necessary (e.g. colour locus or chromaticity coordinates white or green). While the UV range should be blocked as completely as possible, for example in order to avoid damage to sensitive electronic arrangements by the high-energy radiation, the intensity of the incident radiation in the range above 700 nm should be attenuated, so that, for example when used in cameras, the red cast of the image caused by the CCD (charge coupled device) sensors is compensated for. This requires, for example, transmission values in the NIR of from about $10^{-5}$ down to about $10^{-20}$ or about $10^{-22}$ at a predetermined filter thickness.

Description of the Related Art

Fluorophosphate glasses containing copper oxide are known from the prior art (e.g. DE 10 2012 210 552 A1, DE 10 2011 056 873 A1) for use as filters. However, these glasses have the disadvantage that they are difficult to produce owing to the often very high fluorine contents because fluorine itself and the fluorides of many glass components are volatile under the conditions of conventional production methods. Owing to their relatively high coefficient of thermal expansion (measured in the temperature range from 20 to 300° C.) of $>13\times10^{-6}$/K, the processing, after-working and/or further processing (e.g. the cutting, polishing, bonding in "wafer level packaging") of the fluorophosphate glasses is very difficult and expensive. For example, the risk of fracture is high because of thermally induced mechanical stresses brought about during fixing of the glasses required for this purpose. There have therefore been many attempts to optimize the compositions of fluorophosphate glasses with the objective of obtaining glasses which firstly have good stability and secondly are obtainable via economical production processes.

Furthermore, largely fluorine-free phosphate glasses containing copper oxide are known for use as filter glasses (e.g. US2007/0099787 A1, DE 40 31 469 C1). Although such glasses can be easier to process because of their lower coefficient of thermal expansion compared to fluorophosphate glasses, their weathering resistance (also called "climate stability") is generally poorer than the weathering resistance of the fluorophosphate glasses. In addition, there is the problem that the raw materials for such glasses have high melting points and thus require high melting temperatures, i.e. the raw materials for these glasses frequently melt only at temperatures significantly above 1100° C. (e.g. above 1200° C.). At such high temperatures, the equilibrium between the various oxidation states of copper (i.e. Cu(II): Cu(I):Cu(0)) is shifted in the direction of the lower oxidation states. In filter applications, this is associated with a number of disadvantages, especially at higher concentrations of copper oxide: firstly the transmission at the UV edge is worsened by higher proportions of monovalent copper (Cu (I); $Cu_2O$). Secondly, elemental copper (Cu(0)) is formed to an increased extent and this then contributes to demixing of the glass, as a result of which the glass becomes opaque. To stabilize the higher oxidation state in the case of particular ions such as copper ions, the addition of an oxidant such as $CeO_2$, $MnO_2$ or $Cr_2O_3$ is considered to be necessary in the case of known phosphate glasses (e.g. US2007/0099787 A1; DE 40 31 469 C1).

SUMMARY OF THE INVENTION

Due to the ever smaller components for electronic devices, there is an increasing demand for very thin filters i.e. ≤0.21 mm, in particular with thicknesses of about 0.11 mm, for which the glasses have to be coloured more strongly. However, this leads to problems in glass production since the colour-imparting components such as CuO at higher contents act not only as colour-imparting components but also have, as glass constituents, effects on the glass structure (German "Glasgefuege") and other physical properties of the glass.

In the use of copper-containing phosphate glasses for optical filters having very good optical properties, there have hitherto been limitations in some respects: firstly, phosphate glasses have only limited weathering stability, and secondly the mechanical strength is sometimes unsatisfactory. In addition, the increasing miniaturization of optical components requires ever lower filter thicknesses, but this requires significantly higher concentrations of CuO in order to produce the required optical properties. However, higher CuO contents lead to the problems set forth above.

It is therefore an object of the present invention to provide filter glasses which solve the problems of the prior art.

This object has been achieved by the subject matter of the claims.

The object is achieved in particular by a filter glass comprising $K_2O$ and $Na_2O$ and the following (in % by weight on an oxide basis, unless indicated otherwise):

| | |
|---|---|
| $P_2O_5$ | 58-68 |
| $Al_2O_3$ | 5-10 |
| CuO | 8-15 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17 |

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

DESCRIPTION OF THE DRAWINGS

FIGS. 1 and 2 show the transmission curves of filter glasses according to the invention and also of two commercially available fluorine free and vanadium-free phosphate glasses. In contrast to other glasses, filter glasses for the above-described applications are often characterized in terms of specific transmission properties, e.g. $T_{50}$ and blocking. Here, the term blocking refers to the minimum transmission in the NIR range. The $T_{50}$ is the wavelength at which the transmission in the near IR region (NIR) is precisely 50% (see table).

DETAILED DESCRIPTION OF PREFERRED EMBODIMENTS

To the human eye, the glasses of the invention appear blue, bluish green, turquoise or cyan, in greater thicknesses and at high CuO contents through to black, and can be used as IR cut filters. The colours are inconsequential for many applications. Rather, the filter characteristics in terms of the absorption in the UV to about 300 nm and in the near IR (NIR) at about 850 nm brought about by the addition of the colour-imparting oxide CuO are critical for use as filter, e.g. in front of the sensor of digital cameras. The UV blocking is brought about by the base glass itself and by CuO. In order to keep the UV transmission as high as possible starting from a wavelength of 400 nm (often also 430 nm since shorter wavelengths are no longer visually perceived by human beings), oxidants such as nitrates and/or vanadium oxide ($V_2O_5$) can be used.

All proportions given in this specification are in % by weight on an oxide basis unless indicated otherwise.

According to the invention, the glass contains phosphate ($P_2O_5$) in a proportion of from 58 to 68% by weight. As glass former, the content of phosphate of at least 58% by weight is high in the glasses according to the invention. The proportion should not go below this lower limit because a high proportion of a network-forming component is necessary for stabilization against demixing due to the high CuO content for very thin NIR cut filters. Further advantageous lower limits can be 59% by weight, preferably 60% by weight, more preferably 61% by weight, particularly preferably 62% by weight. The upper limit to the phosphate content is, according to the invention, at most 68% by weight. This upper limit should not be exceeded because the stability of the glass in respect of atmospheric moisture can otherwise be impaired. At higher $P_2O_5$ contents, the hygroscopic properties of $P_2O_5$ become more apparent, which can lead to swelling and clouding of the glass and also to formation of voluminous salt layers on the surfaces. Advantageous embodiments of the glasses comprise less than 68% by weight of $P_2O_5$. Some embodiments preferably comprise at most 67% by weight. In preferred embodiments, the glasses of the present invention comprise at most 66% by weight of phosphate.

Aluminium oxide ($Al_2O_3$) is used to increase the weathering stability of the glass since it is a conditional network former but it is not hygroscopic. It is present in proportions of from 5 to 10% by weight in the glasses of the invention. The proportion should not go below the lower limit of 5% by weight in order to obtain a satisfactory weathering stability. At least 6% by weight of $Al_2O_3$ can advantageously be present in the glass. The upper limit of 10% by weight should not be exceeded because higher $Al_2O_3$ contents increase the tendency of the glass to crystallize and in particular increase the melting range of the glass. A glass having a higher melting range also has a higher melting temperature for the batch. Higher melting temperatures lead to reducing conditions in the melt. This results in the equilibrium of those components which can occur in various oxidation states (for example Cu, V, Ce, Nb) being shifted in the direction of the low oxidation states. However, this alters the optical properties of the glass (e.g. absorption, transmission) and thus the characteristic filter properties in an undesirable way. It is advantageous for the content of aluminium oxide to be at most 9% by weight, more preferably at most 8% by weight, most preferably at most 7% by weight.

In order to ensure a satisfactory stability of the glasses of the present invention, the proportion of glass formers, i.e. the sum of phosphate and aluminium oxide, should preferably together amount to at least 63% by weight. A total of at least 65% by weight, preferably at least 67% by weight, can also be advantageous. The sum of the two components is preferably at most 78% by weight, more preferably at most 76% by weight, even more preferably at most 74% by weight.

Furthermore, it has been found to be advantageous to set the weight ratio or mass ratio of phosphate to aluminium oxide to a value of at least 8, preferably at least 9, and/or preferably at most 12. In further preferred embodiments, this value is at most 11, advantageously at most 10.

Like aluminium oxide, silicon oxide ($SiO_2$) increases the tendency of the glass to crystallize and also the temperature of the melting range of the glass and, due to the shift in the equilibrium of the oxidation states of copper oxide, impairs the optical properties of the glass. It should therefore be present in the glass in a proportion of less than 2% by weight, if at all. The glass of the invention advantageously contains less than 1.5% by weight, preferably at most 1% by weight, more preferably less than 1% by weight, of $SiO_2$. A lower limit for $SiO_2$ can be 0.01% by weight. The glass is particularly preferably free of added $SiO_2$. Small proportions of less than 1.5% by weight can be present due to impurities of the raw materials and/or due to the production process in $SiO_2$-containing melt tanks.

As mentioned at the outset, the filter glass according to the invention is a blue filter or IR cut filter. For this reason, it contains copper oxide (CuO) in amounts of from 8 to 15% by weight as colour-imparting component. If copper oxide is used in amounts which are too small (i.e. the proportion is below the lower limit according to the invention of 8% by weight), the light-blocking or radiation-blocking effect in the NIR is not sufficient for the purposes of the present invention because the absorption of Cu in the glass is then too low at small glass thicknesses (for example 0.11 mm). It is advantageous for the glass to contain more than 8% by weight of CuO, preferably at least 9% by weight, more preferably at least 10% by weight. If, on the other hand, an excessively high content of copper oxide is selected, the transmission of the glass is adversely affected because either the absorption of Cu(I) in the UV becomes too high or the glass is made opaque by Cu(0). For this reason, the upper limit of 15% by weight of CuO should not be exceeded. It can be advantageous for the glass to contain at most 14% by weight, preferably at most 13% by weight, more preferably at most 12% by weight, of CuO.

In order to make the UV transmission as high as possible, the glass of the invention contains vanadium oxide ($V_2O_5$) in a proportion of from 0.05 to 1% by weight. It is present in the glass in an amount of at least 0.05% by weight, advantageously at least 0.1% by weight, preferably at least 0.2% by weight, particularly preferably at least 0.5% by weight. The upper limit of 1% by weight, preferably 0.75% by weight, should not be exceeded since absorption in the visible region of the spectrum can occur at higher contents.

The glass of the present invention contains potassium oxide ($K_2O$) and sodium oxide ($Na_2O$) and therefore contains at least two alkali metal oxides $R_2O$. Alkali metal oxides contribute to reducing the melting temperature of the glass. The objective of using the alkali metal oxides is to obtain a batch which melts at temperatures as low as possible despite an $Al_2O_3$ content which is relatively high for phosphate glasses, in order to suppress the formation of monovalent or elemental copper as far as possible. Furthermore, alkali metal oxides assist the processing of the glass by acting as flux in the melt, i.e. by reducing the viscosity of the glass. However, excessively large amounts of these oxides decrease the glass transition temperature, adversely affect the stability of the glasses and increase the coefficient of thermal expansion of the glass. If the latter is particularly high, the glass can no longer be optimally cold postprocessed. Furthermore, the thermal resistance (German "Waermefestigkeit") decreases and the relaxation of the glass in the annealing furnace is made more difficult.

For this reason, the total content of alkali metal oxides (i.e. the total $R_2O$ (R=Li, Na, K)) should be not less than a value of 3% by weight, advantageously 3.1% by weight, preferably 4% by weight, advantageously 5% by weight, advantageously 6% by weight, more preferably 7% by weight, particularly preferably 8% by weight, even more preferably 9% by weight, also preferably 10% by weight. In order not to put the stability of the glasses at risk, the total content of these oxides should not exceed a value of 17% by weight, preferably 16% by weight, also preferably 15% by weight, according to particular variants of the glass of at most 14% by weight. Glasses according to the invention contain at least two members of the group of alkali metal oxides consisting of lithium oxide ($Li_2O$), potassium oxide ($K_2O$) and sodium oxide ($Na_2O$). It has been found to be advantageous here to combine the alkali metal oxides sodium oxide and potassium oxide because this combination exerts a stabilizing effect on the glass in the sense of a mixed alkali metal effect. In advantageous embodiments, $Li_2O$ is also present in addition to $Na_2O$ and $K_2O$.

In advantageous embodiments, the ratio of $K_2O$ (in % by weight)/$Na_2O$ (in % by weight) is >1. The ratio can advantageously be >1.1, preferably >1.2, particularly preferably >1.25. The higher percentage by weight of $K_2O$ compared to $Na_2O$ results in the position of the absorption maximum being positively influenced. It is also advantageous for the ratio of $K_2O$ (in % by weight)/$Na_2O$ (in % by weight) to be <2, preferably <1.9, more preferably <1.8. This results in the absorption maximum being shifted further to longer wavelengths.

The glasses of the invention comprise potassium oxide, preferably in a range from 3 to 10% by weight. 2.9% by weight of $K_2O$ would also be possible. $K_2O$ is used in order to finely adjust the steepness of the edge of the transmission curve to the NIR range. It is advantageous for the amount of $K_2O$ not to go below a minimum amount of 3% by weight, because both the resistance to climatic influences and the steepness of the NIR edge would otherwise be adversely affected. The glass preferably contains at least 4% by weight, more preferably at least 5% by weight, particularly preferably at least 6% by weight, of $K_2O$. However, the content of potassium oxide should not exceed a value of at most 10% by weight, advantageously at most 9% by weight, preferably at most 8% by weight. Otherwise, the chemical resistance of the glass would be impaired too much.

The glasses of the invention additionally comprise sodium oxide, preferably in amounts of from at least 0.1% by weight to 8% by weight. This component is added in an amount of at least 0.1% by weight in order to reduce the melting range of the glass produced. The devitrification stability can also be improved by this constituent. If $Na_2O$ is used in amounts which are too small, this effect is not achieved. The glass advantageously contains at least 0.5% by weight, preferably at least 1% by weight, more preferably at least 2% by weight, even more preferably at least 3% by weight, particularly preferably at least 4% by weight, of $Na_2O$. For stability reasons, a content of at most 8% by weight, advantageously at most 7% by weight, preferably at most 6% by weight, more preferably at most 5% by weight, should not be exceeded.

The glass of the invention can contain lithium oxide in small amounts. It can be advantageous for an upper limit of 2% by weight, advantageously 1.5% by weight, not to be exceeded because otherwise the glass could become destabilized. When the glass comprises $Li_2O$, this component is preferably present in an amount of at least 0.01% by weight, advantageously at least 0.1% by weight, more preferably at least 0.5% by weight, particularly preferably at least 0.8% by weight. Variants of the glass are preferably free of lithium oxide.

The glasses of the invention can be free of alkaline earth metal oxide. Preference is given to the filter glasses of the invention also containing alkaline earth metal oxide. Alkaline earth metal oxides (magnesium oxide (MgO), calcium oxide (CaO), barium oxide (BaO) and strontium oxide (SrO)) can serve to adjust the viscosity and improve the meltability of the glasses. Just like the alkali metal oxides, they are network modifiers. For the purposes of the invention, their content (i.e. the total R'O (R'=Mg, Ca, Sr, Ba)) should not exceed a value of at most 11% by weight since alkaline earth metal can in phosphate glasses have a destabilizing effect on the glass at excessively high contents. In advantageous embodiments, the total R'O can be at most 8% by weight, preferably at most 7% by weight, more preferably at most 6% by weight, particularly preferably at most 5% by weight. If, in an advantageous embodiment of a glass according to the invention, alkaline earth metal oxide is present, the content can be at least 0.1% by weight, preferably at least 0.5% by weight, advantageously at least 1% by weight, more preferably at least 2% by weight.

Preference is given to variants which contain at least magnesium oxide (MgO) from among the known alkaline earth metal oxides. The alkaline earth metal content is, for the purposes of the invention, preferably determined significantly by MgO. It can be advantageous for only MgO to be present as a representative of alkaline earth metal oxides. A preferred range for MgO can be from 1% by weight to 5% by weight. Advantageous embodiments can contain at least 1% by weight, advantageously at least 2% by weight, preferably at least 3% by weight, of MgO. An advantageous upper limit for MgO can for some variants be 5% by weight, preferably 4% by weight. MgO free variants are possible but less preferred. A lower limit for MgO could also be 0.1% by weight, preferably 0.5% by weight.

For the purposes of the invention, calcium oxide (CaO) is an optional component, i.e. CaO-free variants are possible. When CaO is present, this component is present in an amount of preferably at most 3% by weight, more preferably at most 2% by weight, preferably at most 1% by weight and/or at least 0.01% by weight, advantageously at least 0.1% by weight. CaO is less preferred as glass component for the purposes of the invention since calcium ions compete with copper ions for sites in the glass network because of their size and charge. In the case of glasses having very high CuO contents, an excessively high CaO content can contribute to the upper limit for demixing of the glass to be reached more quickly.

Barium oxide (BaO) and/or strontium oxide (SrO) can be present in some variants, for example in each case in a proportion of at least 0.01% by weight. If BaO is to be present, the upper limit is advantageously 3% by weight, preferably 2% by weight, more preferably 1% by weight. The same upper limits apply to SrO. The filter glasses of the invention are preferably free of BaO and/or SrO. BaO and/or SrO are less preferred components since in the glass they result in a reduced crystallization stability and a poorer melting behaviour than alkali metal oxides or MgO/CaO.

Zinc oxide (ZnO) is used in many known blue filter glasses, e.g. for reducing the coefficient of thermal expansion and increasing the thermal resistance (German "Waermefestigkeit") and improving the relaxation-ability of the glass in the annealing furnace. Owing to the particular composition of the glasses of the present invention, zinc oxide can be dispensed with, which is advantageous. It has been discovered that the use of ZnO in the glasses of the invention impairs the weathering stability (climate stability); the reasons for this have hitherto not been elucidated. However, if ZnO is used, the content should be at least 0.05% by weight and/or at most 3% by weight; in particular embodiments, the content is at most 2% by weight, advantageously at most 1% by weight. The glass of the invention is preferably free of added ZnO.

In order to reduce the coefficient of thermal expansion, lanthanum oxide ($La_2O_3$) can be present in the glass of the invention. When $La_2O_3$ is present, the content is advantageously at least 0.01% by weight, advantageously at least 0.1% by weight, preferably at least 0.5% by weight, more preferably at least 1% by weight. Since $La_2O_3$ is a costly glass component, it is advantageous for the proportion not to exceed an upper limit of 4% by weight, preferably 3.5% by weight. Some variants can also be free of $La_2O_3$.

Some embodiments of the present invention also comprise cerium oxide ($CeO_2$) in amounts of at least 0.01% by weight, preferably at least 0.02% by weight, and/or less than 1% by weight, preferably at most 0.8% by weight, more preferably at most 0.6% by weight, most preferably at most 0.5% by weight. Cerium oxide increases the resistance of the glass to UV radiation by absorbing in the UV range. In the context of the invention, it has surprisingly been found that filter glasses having the desired transmission properties can be produced without addition of cerium oxide, i.e. these advantageous embodiments are free of cerium oxide. The base glass, i.e. the phosphate glass without the colour-imparting ions, has such good optical properties that $CeO_2$ is not necessary. As a result of this measure, the glass composition advantageously has only two components, namely copper oxide and vanadium oxide, which can, depending on the redox state of the melt, be present in different valences, for which reason a stable setting of the NIR edge can be achieved in manufacture of the glass. The setting should be so precise that the permitted $T_{50}$ tolerance for a finished filter can be adhered to. In contrast, if CuO, $V_2O_5$ and $CeO_2$ are present in the glass, stable setting of the NIR edge can be made significantly more difficult even in the case of continuous manufacture.

The glass of the invention may contain fluorine in a proportion of less than 1% by weight, preferably less than 0.5% by weight, more preferably less than 0.1% by weight. Particularly preferred variants of the glass are free of fluorine as added glass component. If fluorine is to be present, 0.01% by weight can be a lower limit. Although fluorine improves the weathering stability of phosphate glasses, the production process for the glasses is difficult to control because of the volatility of this component. In addition, the mechanical workability of the glasses is made difficult by contents of fluorine, since such glasses have a higher coefficient of thermal expansion.

Like fluorine, boron oxide ($B_2O_3$) tends to vaporize, for which reason the content of boron oxide should be only very low. Furthermore, boron also has an adverse effect on the resistance to climatic influences. According to the invention, the boron oxide content is preferably at most 1% by weight. Particular preference is given to the boron oxide content being at most 0.5% by weight. In advantageous variants, no boron oxide is added as glass component to the glass of the invention, i.e. the glass is free of $B_2O_3$. If $B_2O_3$ is to be present, 0.01% by weight can be a lower limit.

The glasses of the invention are preferably free of iron oxide ($Fe_2O_3$) because this oxide can have an adverse effect on the transmission properties of the glasses and can likewise contribute to the redox equilibrium of CuO, which makes setting of a stable process difficult. If alternative embodiments nevertheless contain iron oxide, its content is limited to at most 0.25% by weight. $Fe_2O_3$ can get into the glass as impurity via other components. In preferred embodiments, the glasses of the invention do not contain any further colour-imparting oxides in addition to copper oxide; in particular, the glass is free of cobalt oxide (CoO).

The glass of the invention is, as filter glass, preferably free of other colour-imparting components such as Cr, Mn and/or Ni and/or optically active, e.g. laser-active, components such as Pr, Nd, Sm, Eu, Tb, Dy, Ho, Er and/or Tm. In addition, the glass is preferably free of components which are hazardous to health, e.g. oxides of As, Pb, Cd, Tl and Se. The glasses of the present invention are also preferably free of radioactive constituents.

Furthermore, the glass of the invention is preferably free of rare earth metal oxides such as niobium oxide ($Nb_2O_5$), yttrium oxide ($Y_2O_3$), ytterbium oxide ($Yb_2O_3$), gadolinium oxide ($Gd_2O_3$) and also of tungsten oxide ($WO_3$) and/or of zirconium oxide ($ZrO_2$), with, as an exception, $La_2O_3$ being able to be present, as described above. $Nb_2O_5$ is sparingly soluble in the melt. In addition, niobium is a polyvalent ion which participates in the redox equilibrium in the melt. If it is present in the lower oxidation state, it can bring about a brown coloration of the glass. Gadolinium oxide, tungsten oxide, zirconium oxide and/or ytterbium oxide increase the risk of crystallization of the glass and the melting temperatures can be increased. Yttrium oxide can impair the weathering resistance of the glass.

In one embodiment of the present invention, the glass of the invention preferably consists to an extent of at least 90% by weight, more preferably at least 95% by weight, most preferably 99% by weight, of the abovementioned components.

In one embodiment, the glass consists to an extent of 90% by weight, preferably 95% by weight, more preferably 97% by weight, of the components $P_2O_5$, $Al_2O_3$, MgO, $Na_2O$, $K_2O$, CuO and $V_2O_5$.

In one embodiment, the glass consists to an extent of 95% by weight, preferably 98% by weight, more preferably 99% by weight, of the components $P_2O_5$, $Al_2O_3$, MgO, $Na_2O$, $K_2O$, CuO, $V_2O_5$, $La_2O_3$ and $Li_2O$.

In one embodiment of the present invention, the glass of the invention is also preferably free of other components which are not mentioned in the claims or in the description, i.e. according to such an embodiment the glass consists essentially of the components indicated above, with individual components which are not mentioned or indicated as being less preferred being able to be left out. Here, the expression "consist essentially of" means that other components are present at most as impurities, but are not deliberately added as individual components to the glass composition.

When it is said in the present description that the glasses are free of a component or do not contain a certain component, it is meant by this that this component may be present at most as impurity in the glasses. This means that it is not added in significant amounts or not at all as glass component. According to the invention, amounts which are not significant are amounts of less than 100 ppm, preferably less than 50 ppm and most preferably less than 10 ppm.

In the case of this glass, refining is preferably carried out predominantly by physical refining, i.e. the glass is so fluid at the melting/refining temperatures that the bubbles can rise. The addition of refining agents promotes the release or uptake of oxygen in the melt. In addition, polyvalent oxides can participate in the redox behaviour and thus promote the formation of Cu(II)O.

The glass of the invention can therefore contain customary refining agents in small amounts. The sum of the refining agents added is preferably at most 1.0% by weight, more preferably at most 0.5% by weight. As refining agent, the glass of the invention can contain at least one of the following components (in % by weight):

| | |
|---|---|
| $Sb_2O_3$ | 0-1 and/or |
| $As_2O_3$ | 0-1 and/or |
| SnO | 0-1 and/or |
| Halide (Cl, F) | 0-1 and/or |
| $SO_4^{2-}$ | 0-1 and/or |
| Inorganic peroxides | 0-1 |

As inorganic peroxides, it is possible to use, for example, zinc peroxide, lithium peroxide and/or alkaline earth metal peroxides.

In advantageous embodiments of the present invention, the glass is free of As2O3 since this component is considered to be problematical for ecological reasons.

The coefficients of thermal expansion ($\alpha_{20-300}$) measured for the temperature range from 20 to 300° C. of the glasses of the invention are preferably in a range of not more than $13 \times 10^{-6}$/K, more preferably at most $12.5 \times 10^{-6}$/K and particularly preferably at most $12 \times 10^{-6}$/K. This avoids problems associated with thermally induced mechanical stress in further processing and joining technology. The mechanical strength is increased thereby. A lower limit to the coefficient of expansion can be $9.5 \times 10^{-6}$/K, preferably $10 \times 10^{-6}$/K.

The glasses of the invention should have a glass transition temperature or transformation temperature ($T_g$) as high as possible. The lower the $T_g$, the weaker is the glass network and the more brittle is the glass and therefore more susceptible to moisture. The higher the transformation temperature, the higher is the hardness of the respective phosphate glass. For this reason, filter glasses according to the invention advantageously have a transformation temperature of more than 400° C., preferably more than 415° C.

In addition, the glasses of the invention have a melting range ($<T_3$) as low as possible. Such glasses have a correspondingly low melting temperature for the raw materials of the batch. That is to say, the components of the glass are, according to the invention, selected so that a batch melting as low as possible is obtained. The melting temperature of the batch should advantageously be less than 1200° C., preferably at most 1150° C., more preferably at most 1100° C. As a result of this low melting temperature, the melt advantageously remains in oxidizing conditions and Cu(II)O is predominantly present. The formation of Cu(I) and metallic copper is thus suppressed. A glass having a high transmission is therefore obtained. Despite the high copper contents, these filter glasses display no clouding and no copper mirror on the surface. As a result, glasses according to the invention can be manufactured not only in crucibles, but also in melting tanks (i.e. continuous apparatuses).

The glasses of the invention display good filter characteristics. The glass of the invention preferably has, at a sample thickness of 0.11 mm, an internal transmission $\tau_i$ at 400 nm of more than 80%, preferably more than 82.5%, more preferably more than 85%, particularly preferably at least 87.5%. It is also advantageous for the glass to have, at a sample thickness of 0.11 mm, an internal transmission $\tau_i$ at 520 nm of more than 90%, preferably more than 93%, more preferably more than 95%, even more preferably at least 96%.

The $T_{50}$ value of the filter glasses of the invention, i.e. the wavelength at which the transmission in the near IR range (NIR) is precisely 50%, is, at a sample thickness of 0.11 mm, advantageously in the range from 625 nm to 640 nm, preferably in the range from 630 nm to 638 nm.

The glasses according to the invention have a characteristic colour in the CIE-colour space (German "CIE-Normvalenzsystem"). The following data (CIE xyY) refer to a filter glass thickness of 0.11 mm in each case. The parameter CIE-x advantageously amounts at least 0.276, preferably at least 0.278, more preferably at least 0.280 and/or advantageously at most 0.290, preferably at most 0.288, more preferably at most 0.286. The parameter CIE-y advantageously amounts at least 0.310, preferably at least 0.312, more preferably at least 0.314 and/or advantageously at most 0.326, preferably at most 0.324, more preferably at most 0.322. The parameter CIE-Y advantageously amounts at least 70.0, preferably at least 75.0, more preferably at least 78.0 and/or advantageously at most 90.0, preferably at most 85.0, more preferably at most 81.0.

The glass of the invention has a good resistance or stability to climatic influences, also referred to as weathering resistance or climate stability. In particular, the glass can be exposed to a temperature of 85° C. and a relative atmospheric humidity of 85% for at least 400 hours, preferably at least 500 hours, without the transmission properties being impaired by clouding on the surface or in the volume.

The glasses of the invention have made it possible to solve the above-described problems associated with filter glasses. It has been made possible to dispense with fluorine and nevertheless provide a weathering-stable phosphate glass having very high CuO contents. Due to the lower coefficient of thermal expansion (compared to fluorophosphate glasses), the mechanical strength is improved and the risk of fracture of the glass during further processing is reduced. Due to the targeted setting of the glass components and the specific selection of the raw materials via which the respective glass components get into the glass (e.g. in the form of complex phosphates), the melting temperature during glass production is kept low. This makes it possible for high contents of CuO, which are necessary for producing thin filters, to be present in the glass and good filter characteristics (transmission values and absorption values) nevertheless to be achieved.

A filter according to the invention comprises a filter glass according to the invention as described above. It is advantageous for the filter to have at least one coating on at least one side. The coating is preferably an antireflection (AR) and/or UV/IR cut coating. These layers reduce reflections and increase the transmission or reinforce IR blocking and make the absorption edge in the region of 650 nm steeper. These layers are interference layers. In the case of an antireflection layer, the antireflection layer is composed of from 4 to 10 sublayers of different and/or alternating composition on at least one side of the glass. In the case of an UV/IR cut coating, there are preferably even 50 to 70 sublayers of different and/or alternating composition forming the UV/IR cut coating. These layers, sublayers preferably consist of hard metal oxides such as, in particular, $SiO_2$, $Ta_2O_3$, $TiO_2$ or $Al_2O_3$, or metal oxynitrides. These layers, sublayers are preferably applied to different sides of the filter glass. Such coatings also increase the weathering resistance/resistance to climatic influences further.

An important aspect of this invention is also the production process of the glasses according to the invention. By following the steps described below, the claimed glasses can be obtained.

To produce the glasses according to the invention, complex phosphate and/or metaphosphate is preferably added as raw material to the batch. The expression "complex phosphate" means that phosphate is not added in the form of "free" $P_2O_5$ to the batch, but instead glass components such as $Na_2O$, $K_2O$, etc., are added not in oxidic or carbonate form but as phosphate, e.g. $Mg(H_2PO_4)_2$, $LiH_2PO_4$, $KPO_3$, $NaPO_3$, to the batch. This means that the phosphate is added as an anionic component of a salt, with the corresponding cationic component of this salt itself being a glass constituent. Metaphosphates (e.g. $Al(PO_3)_3$) are polyphosphates, in particular polyphosphates having ring structures, which are advantageously used since they introduce more phosphate equivalents per cation equivalent into the glass. This has the advantage that the proportion of phosphate (complex phosphates, metaphosphates) increases at the expense of free $P_2O_5$, which can lead to good manageability in the melting process and significantly reduced vaporization and dusting effects, associated with an improved internal quality. In addition, an increased proportion of free phosphate places increased demands on the safety aspects of production operation, as a result of which the production costs increase. The measure according to the invention considerably improves the processability of the glass composition: the batch is dryer and can be mixed better. In addition, the amounts weighed in are more accurate than when using raw materials which take up increasing amounts of water from the surroundings during storage.

Preference is given to only few glass components being added as oxides. The alkali metal oxides and alkaline earth metal oxides can also be introduced as carbonates.

According to the invention, the raw materials for the glass are selected so that a batch melting as low as possible is obtained (melting temperature preferably <1150° C., preferably <1100° C.).

Oxidizing conditions can be set in the melt by addition of nitrates to the batch. Nitrates also act as flux and contribute to lowering the melting temperatures. The presence of copper ions in the oxidation state +2 and of vanadium ions in the oxidation state +5 is important for the absorption in the IR range. The glass is therefore melted under oxidizing conditions in a manner known per se. As an alternative to or in addition to the use of nitrates, oxygen can be bubbled into the melt (see below).

The glass of the invention is melted from a uniform, previously well-mixed batch of appropriate composition in a discontinuous melting apparatus, e.g. Pt crucibles, or continuous melting apparatus, e.g. AZS ($Al_2O_3$—$ZrO_2$—$SiO_2$) tank, Pt tank or fused silica tank, at temperatures of from 930 to 1150° C., then refined and homogenized. During melting of the glass, the components present in the crucible or tank material can be introduced into the glass. That is to say, after melting in a fused silica tank, up to 2% by weight of $SiO_2$ can be present in the glass, even when these have not been explicitly added. The melting temperatures depend on the composition selected.

Oxygen can preferably be bubbled through the glass in order to set the redox conditions in the melt. The glass of the invention can, in particular, be produced by means of a process in which bubbling of oxygen through the melt is carried out in the case of discontinuous melting, for example melting in a crucible, for a time of from 10 to 40 minutes, preferably from 10 to 30 minutes. In the case of continuous melting, for example melting in a tank, bubbling can preferably be carried out continuously and preferably in the melting region of the tank. The flow rate of the oxygen is preferably at least 40 litres per hour, more preferably at least 50 l/h, and also preferably at most 80 l/h and more preferably at most 70 l/h. In addition, the bubbling serves to homogenize the melt. Apart from its above-described effects, it also assists crosslinking in the glass.

If these parameters are taken into account, a glass according to the invention is obtained when the composition ranges according to the invention are adhered to. The production process described here is part of the present invention, just like the glass which can be produced thereby.

The refining of the glass is preferably carried out at from 980 to a maximum of 1200° C. The temperatures should generally be kept low in order to keep the vaporization of the volatile components such as $Li_2O$ and $P_2O_5$ as low as possible.

The invention also provides for the use of the filter glasses according to the invention as filters, in particular NIR cut filters. In addition, the use of these glasses for protecting CCDs in cameras is provided for by the invention. Furthermore, the filter glasses of the invention can be used within the scope of the invention in fields such as safety, aviation, night vision and the like.

The entire disclosures of all applications, patents and publications, cited above and below, and of corresponding German application 10 2017 207 253.9 filed Apr. 28, 2017, are hereby incorporated by reference.

The present invention will be illustrated below by a series of examples. However, the present invention is not limited to the examples mentioned.

EXAMPLES

To produce a filter glass having the composition corresponding to a working example, a corresponding glass batch is intensively mixed. This batch is melted at 1100° C. over a period of about 3 hours and oxygen is bubbled through it for about 30 minutes. Owing to the low viscosity, refining is likewise carried out at 1100-1150° C. After standing for from about 15 to 30 minutes, the glass is cast at a temperature of about 950° C.

FIGS. 1 and 2 show the transmission spectra of glasses according to the invention. For comparison, FIG. 1 also shows the transmission curves (a and b) of two commercially available fluorine-free and vanadium-free phosphate glasses. The glasses according to the invention have excellent filter properties. Apart from a high transparency (≥70% transmission) in the wavelength range from about 370 to about 600 nm, the transmission curves of the glasses according to the invention display steep edges, i.e. a rapid decrease in transmission, in both directions to the adjoining spectrum in each case. In the region of high transmission, the transmission curves are flat at the top over a larger wavelength range, which can be seen particularly well in FIG. 2 (Working Example 8). Compared to glasses of the prior art, it can also be clearly seen that the filter glasses according to the invention have a significantly higher transmission in the UV range (e.g. at a wavelength of 400 nm). The thickness of the sample is 0.11 mm for all glasses presented.

The glasses have a Knoop hardness HK of from about 400 to 450, and further variants can also have even higher values up to about 475, and are thus readily processable and at the same time sufficiently scratch resistant. The coefficients of thermal expansion are from $9.5 \times 10^{-6}/K$ to $<13 \times 10^{-6}/K$, measured for the temperature range from 20 to 300° C. The glass transition temperatures $T_g$ of the glasses are from about 415 to 450° C.

In addition, in table 1 the chromaticity coordinates CIE-x and CIE-y and the luminance-value CIE-Y of the working examples are given referring to a filter glass thickness of 0.11 mm. These values, determined according to specification "CIE-1931", describe the colour locus of a filter glass according to the invention in the xyY colour space. The data refer to the known CIE-colour space (German "CIE-Normvalenzsystem"). The parameter CIE-x and CIE-y define the chromaticity. The colour proportion CIE-z can be calculated by x+y+z=1. Taking the working examples it can be seen that CIE-x is from 0.2808 to 0.2855 and CIE-y is from 0.3165 to 0.3211. CIE-Y varies between 78.33 and 80.41. Overall, the values only show minor colour fluctuations. Thus the filter glasses according to the invention have a high reliability of colour locus.

TABLE 1

(Working examples in % by weight)

| | No. 1 | No. 2 | No. 3 | No. 4 | No. 5 | No.6 | No. 7 | No. 8 |
|---|---|---|---|---|---|---|---|---|
| $SiO_2$ | | | 0.6 | | | | | 1.0 |
| $P_2O_5$ | 62.8 | 62.6 | 62.3 | 64.8 | 65.9 | 64.9 | 64.2 | 63.6 |
| $Al_2O_3$ | 6.5 | 6.5 | 6.4 | 6.5 | 6.6 | 6.5 | 6.5 | 6.7 |
| $Li_2O$ | 1.0 | 0.9 | 1.0 | 1.0 | 1.0 | 1.1 | 1.1 | 1.1 |
| $Na_2O$ | 4.8 | 4.8 | 4.7 | 4.8 | 4.9 | 4.9 | 4.8 | 4.8 |
| $K_2O$ | 6.1 | 6.1 | 6.0 | 6.2 | 6.3 | 6.2 | 8.1 | 6.1 |
| MgO | 3.3 | 3.4 | 3.3 | 3.4 | 3.5 | 3.4 | 3.4 | 3.4 |
| $La_2O_3$ | 3.5 | 3.4 | 3.4 | 1.5 | | 1.5 | | 1.5 |
| CuO | 11.2 | 11.2 | 11.2 | 10.7 | 10.7 | 10.9 | 10.8 | 11.2 |
| $CeO_2$ | 0.5 | 0.5 | 0.5 | 0.5 | 0.5 | | 0.5 | |
| $V_2O_5$ | 0.3 | 0.6 | 0.6 | 0.6 | 0.6 | 0.6 | 0.6 | 0.6 |
| Total | 100.0 | 100.0 | 100.0 | 100.0 | 100.0 | 100.0 | 100.0 | 100.0 |
| $CTE_{(20,300)}$ ($\times 10^{-6}/K$) | 11.36 | 11.29 | 11.2 | 11.43 | 11.53 | 11.44 | 12.12 | 11.54 |
| Tg (° C.) | 421 | 426 | 424 | 418 | 416 | 422 | 415 | 417 |
| Density (g/cm³) | 2.885 | 2.884 | 2.880 | 2.832 | 2.801 | 2.825 | 2.808 | 2.820 |
| $T_{50}$ (nm) (0.11 mm) | 635.55 | 628.58 | 630.21 | 635.11 | 637.65 | 636.10 | 633.74 | 632.78 |
| τi(400 nm) (0.11 mm) | 0.855 | 0.870 | 0.874 | 0.885 | 0.894 | 0.894 | 0.888 | 0.896 |
| τi(520 nm) (0.11 mm) | 0.960 | 0.963 | 0.964 | 0.967 | 0.971 | 0.970 | 0.969 | 0.975 |
| CIE-x (0.11 mm) | 0.2851 | 0.2817 | 0.2818 | 0.2846 | 0.2855 | 0.2846 | 0.2835 | 0.2808 |
| CIE-y (0.11 mm) | 0.3204 | 0.3211 | 0.3200 | 0.3205 | 0.3199 | 0.3196 | 0.3199 | 0.3165 |
| CIE-Y (0.11 mm) | 79.39 | 78.33 | 78.71 | 79.77 | 80.41 | 80.05 | 79.58 | 79.65 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Filter glass comprising $Na_2O$ and $K_2O$ and the following (in % by weight on an oxide basis):

| | |
|---|---|
| $P_2O_5$ | 58-68 |
| $Al_2O_3$ | 5-10 |
| CuO | 8-15 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17 | wherein a ratio of K₂O (in % by weight)/Na₂O (in % by weight) is >1.

2. Filter glass according to claim 1, wherein the filter glass contains $K_2O$ in an amount of from 3 to 10% by weight and $Na_2O$ in an amount of from 0.1 to 8% by weight.

3. Filter glass according to claim 1, wherein the total $R_2O$ is at least 4% by weight and at most 15% by weight.

4. Filter glass according to claim 1, wherein the ratio of $K_2O$ (in % by weight)/$Na_2O$ (in % by weight) is >1.1.

5. Filter glass according to claim 1, wherein the filter glass contains MgO in an amount of at most 5% by weight and the total proportion of R'O is at least 1% by weight.

6. Filter glass according to claim 1, wherein the content of CuO is at least 9% by weight and at most 14% by weight.

7. Filter glass according to claim 1, wherein the content of CuO is at least 10% by weight and at most 13% by weight.

8. Filter glass according to claim 1, wherein $V_2O_5$ is present in an amount of at least 0.2% by weight.

9. Filter glass according to claim 1, wherein $V_2O_5$ is present in an amount of at least 0.5% by weight and at most 0.75% by weight.

10. Filter glass according to claim 1, wherein the filter glass further comprises $La_2O_3$ at a content of at least 0.5% by weight and at most 3.5% by weight.

11. Filter glass according to claim 1, wherein the glass is free of one or more components selected from the group consisting of $B_2O_3$, $SiO_2$, CaO, BaO, SrO, ZnO, $ZrO_2$, $Nb_2O_5$, $Y_2O_3$, $Yb_2O_3$, $Gd_2O_3$, $WO_3$, $Fe_2O_3$, PbO, CoO, Cr, Mn, Ni, Pr, Nd, Sm, Eu, Tb, Dy, Ho, Er and Tm.

12. Filter glass according to claim 1, wherein the glass has, at a sample thickness of 0.11 mm, an internal transmission $\tau_i$ at a wavelength of 400 nm of more than 85%.

13. Filter glass according to claim 1, wherein the filter glass has a coefficient of thermal expansion ($\alpha_{20-300}$) of at least $9.5 \times 10^{-6}$/K and at most $13 \times 10^{-6}$/K.

14. Filter glass according to claim 1, wherein the filter glass has a transformation temperature of more than 400° C.

15. Filter comprising a filter glass, the filter glass comprising $Na_2O$ and $K_2O$ and the following (in % by weight on an oxide basis):

| | |
|---|---|
| $P_2O_5$ | 58-68 |
| $Al_2O_3$ | 5-10 |
| CuO | 8-15 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17 | wherein a ratio of $K_2O$ (in % by weight)/$Na_2O$ (in % by weight) is >1.

16. Filter according to claim 15, wherein the filter glass has a coating on at least one of its surfaces.

17. Filter glass according to claim 1, wherein the ratio of $K_2O$ (in % by weight)/$Na_2O$ (in % by weight) is <2.

18. Filter glass according to claim 1, wherein the glass has, at a sample thickness of 0.11 mm, an internal transmission $\tau_i$ at a wavelength of 400 nm of at least 87.5%.

19. Filter glass having, at a sample thickness of 0.11 mm, an internal transmission $\tau_i$ at a wavelength of 400 nm of more than 85%, and a $T_{50}$ value in the range 625 nm to 640 nm, wherein the filter glass is a vanadium oxide containing phosphate-glass comprising CuO at a content of 8-15% by weight and comprising $La_2O_3$ at a content of 0.1-4% by weight.

20. Filter glass having, at a sample thickness of 0.11 mm, an internal transmission $\tau_i$ at a wavelength of 400 nm of more than 85%, and a $T_{50}$ value in the range 625 nm to 640 nm, wherein the filter glass is a vanadium oxide containing phosphate-glass comprising CuO at a content of 8-15% by weight, wherein a ratio of $K_2O$ (in % by weight)/$Na_2O$ (in % by weight) is >1.

21. Filter glass according to claim 19, comprising $Na_2O$ and $K_2O$ and the following (in % by weight on an oxide basis):

| | |
|---|---|
| $P_2O_5$ | 58-68 |
| $Al_2O_3$ | 5-10 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17 |

22. Filter glass according to claim 20, comprising $Na_2O$ and $K_2O$ and the following (in % by weight on an oxide basis):

| | |
|---|---|
| $P_2O_5$ | 58-68 |
| $Al_2O_3$ | 5-10 |
| $V_2O_5$ | 0.05-1 |
| $SiO_2$ | <2 |
| F | <1 |
| Total R'O (R' = Mg, Ca, Sr, Ba) | 0-11 |
| Total $R_2O$ (R = Li, Na, K) | 3-17 |

23. Filter glass according to claim 22, further comprising $La_2O_3$ at a content of 0.1-4% by weight.

24. Filter glass according to claim 19, wherein the content of $V_2O_5$ is in the range 0.05-1% by weight.

25. Filter glass according to claim 20, wherein the content of $V_2O_5$ is in the range 0.05-1% by weight.

* * * * *